(No Model.)
F. A. HOLLENBECK.
KNOB ATTACHMENT.
No. 407,661. Patented July 23, 1889.
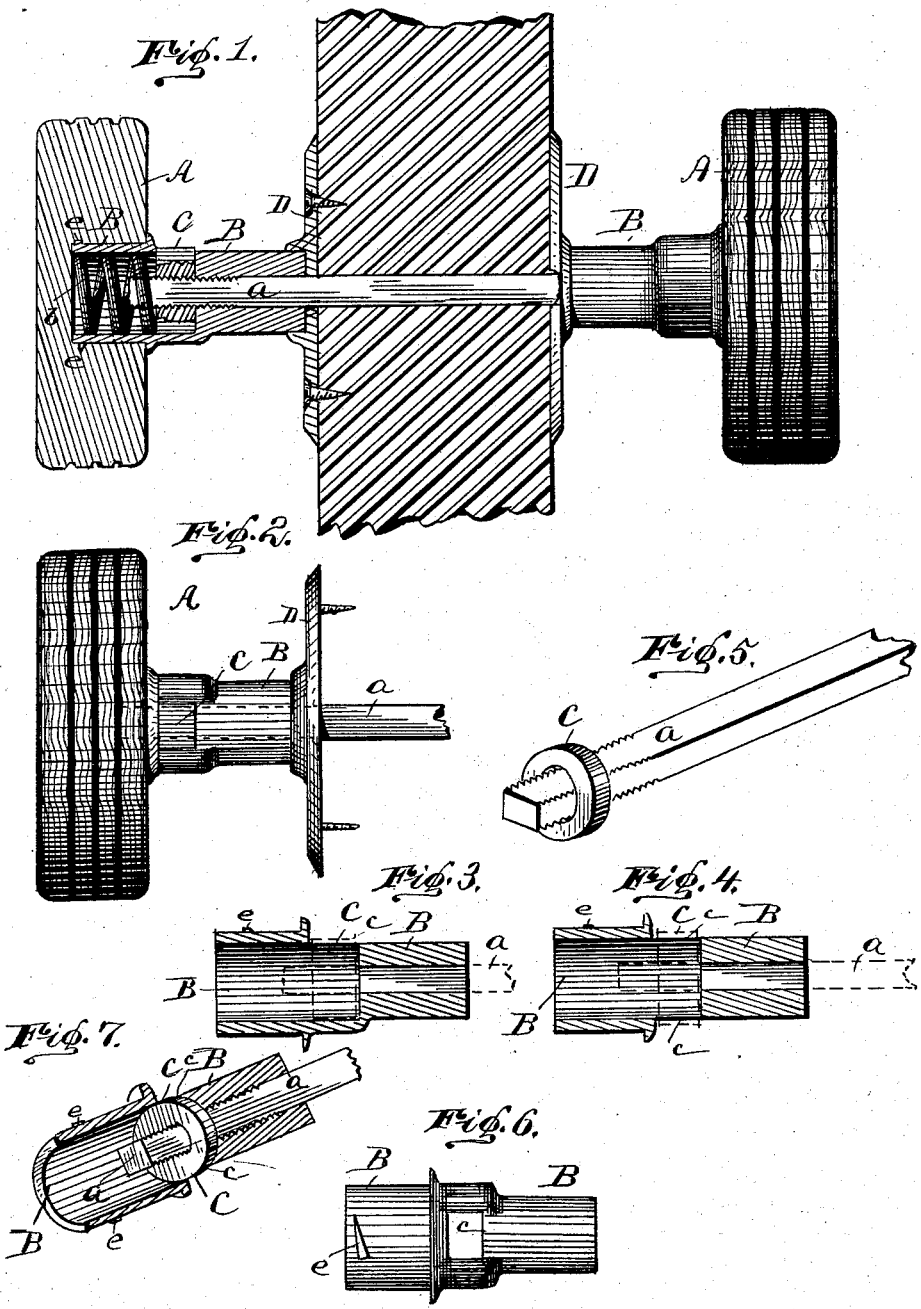
Witnesses
C. W. H. Brown,
E. C. Morgan
Inventor
Frank A. Hollenbeck

UNITED STATES PATENT OFFICE.

FRANK A. HOLLENBECK, OF SYRACUSE, NEW YORK.

KNOB ATTACHMENT.

SPECIFICATION forming part of Letters Patent No. 407,661, dated July 23, 1889.

Application filed February 9, 1888. Serial No. 263,550. (No model.)

*To all whom it may concern:*

Be it known that I, FRANK A. HOLLENBECK, of Syracuse, in the county of Onondaga, in the State of New York, a citizen of the United States, have invented certain new and useful Improvements in Door-Knobs, of which the following is a specification, reference being had to the accompanying drawings, in which—

Figure 1 is a sectional elevation thereof. Fig. 2 is a side elevation of same complete; Fig. 3, a longitudinal section of shank and spindle; Fig. 4, a like view of same; Fig. 5, a detail of spindle and nut; Fig. 6, an elevation or top plan view of the shank; Fig. 7, a sectional elevation of the shank, spindle, and nut.

My invention relates to devices for securing a door-knob upon the spindle which passes through the door; and my object is to improve and simplify the fastening mechanism and to produce an improved door-knob at a reduced cost of construction.

My invention consists in the several novel features of construction and operation hereinafter described, and which are specifically set forth in the claim hereunto annexed.

It is constructed as follows:

A is the knob, provided with an ordinary recess in its inner face to receive the outer end of the shank B. This shank in its inner end is provided with a rectangular opening or bore to receive the spindle $a$, also rectangular, and in its outer end with an enlarged recess or bore, which may be tubular or cylindrical. It is also provided with a vertical mortise $c$, opening inwardly into the enlarged bore. The spindle is threaded upon its edges or corners, substantially as shown, and C is a nut screwing onto the spindle. This nut is inserted into the shank through the mortise $c$, the hole in the nut coinciding with the spindle-hole in the shank, and $b$ is a spring, which, when used, is inserted within the shank and operates to hold the nut up against the shoulder in the shank. It will be observed that the mortise in the shank is not within the knob, but is inside of the inner face thereof, and that the nut projects outward through the mortise, and that the knob and shank are not screwed upon the spindle directly nor screwed into the nut, but that the nut is screwed onto the spindle and draws the shank and knob onto the spindle, and that the nut is always accessible and can be rotated by the fingers inside of the knob-face at any time.

Upon the outer end of the shank I provide a wedging spline or feather $e$, having its outer face substantially straight and its inner one tapering or wedging down to a sharp edge, substantially as shown in Fig. 6. I arrange these splines in a line around the shank, and when the shank is driven home into the knob I twist it a little, thereby forcing the splines into the wood out of the line of their entrance, and they thus operate not as a screw but as a lock to hold the knob and shank together.

In Fig. 5 I show the nut C applied to a rectangular spindle, which is oblong in cross-section, not square.

D D are the escutcheons or roses, of any desired style and form.

It will be observed that the spring $b$ bears frictionally at all times against the nut C, and thus prevents said nut from backing up or unscrewing when the knob is operated.

What I claim as my invention, and desire to secure by Letters Patent, is—

A door-knob shank provided with a mortise $c$, a nut inserted into the shank and accessible through the mortise, and a spring within the shank bearing against the nut, in combination with a threaded spindle, substantially as described.

In witness whereof I have hereunto set my hand this 9th day of January, 1888.

FRANK A. HOLLENBECK.

In presence of—
 C. W. SMITH,
 JAMES R. MARCY.